(12) United States Patent
Walther et al.

(10) Patent No.: US 9,447,269 B2
(45) Date of Patent: Sep. 20, 2016

(54) MODIFIED FLEXIBLE EVOH FOR HIGH PERFORMANCE FILMS

(71) Applicant: Dow Global Technologies LLC, Midland, MI (US)

(72) Inventors: Brian W. Walther, Clute, TX (US); Sharon Baker, Lake Jackson, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 13/744,590

(22) Filed: Jan. 18, 2013

(65) Prior Publication Data

US 2014/0205821 A1 Jul. 24, 2014

(51) Int. Cl.
| | |
|---|---|
| *B32B 7/02* | (2006.01) |
| *C08L 29/04* | (2006.01) |
| *B32B 27/32* | (2006.01) |
| *C08J 5/18* | (2006.01) |

(Continued)

(52) U.S. Cl.
CPC .................. *C08L 29/04* (2013.01); *B32B 7/02* (2013.01); *B32B 27/08* (2013.01); *B32B 27/32* (2013.01); *B32B 27/34* (2013.01); *C08J 5/18* (2013.01); *B32B 2250/24* (2013.01); *B32B 2307/7244* (2013.01); *B32B 2307/7248* (2013.01); *B32B 2439/70* (2013.01); *C08J 2329/04* (2013.01); *C08J 2423/08* (2013.01); *Y10T 428/24975* (2015.01); *Y10T 428/31855* (2015.04); *Y10T 428/31913* (2015.04)

(58) Field of Classification Search
CPC ....... B32B 27/08; B32B 27/32; B32B 27/18; B32B 27/306; B32B 2439/70; B32B 2307/7244; B32B 2307/74; B32B 2250/24; B32B 2307/7248; C08J 5/18; C08J 2329/04; C08J 2423/08; C08L 29/04; Y10T 428/24975; Y10T 428/31855; Y10T 428/31913
USPC ......... 428/35.6, 212, 216; 525/242; 526/348
See application file for complete search history.

(56) References Cited

U.S. PATENT DOCUMENTS

| | | | |
|---|---|---|---|
| 5,084,352 A | * | 1/1992 | Percec .................. B32B 27/08 264/176.1 |
| 6,054,544 A | | 4/2000 | Finlayson et al. |

(Continued)

FOREIGN PATENT DOCUMENTS

| | | | |
|---|---|---|---|
| JP | 2011157539 A | * | 8/2011 |
| JP | 2011252101 A | | 12/2011 |

OTHER PUBLICATIONS

Applicant's Arguments U.S. Appl. No. 13/744,590 (Clarified Figures).*

(Continued)

*Primary Examiner* — Prashant J Khatri
*Assistant Examiner* — Travis Figg
(74) *Attorney, Agent, or Firm* — Cantor Colburn LLP

(57) ABSTRACT

The present invention relates to a film having a combination of good flexibility and excellent barrier properties. The film comprises at least one barrier layer. The barrier layer comprises at least 5 percent, by weight of the layer, of an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min. The barrier layer further comprises at least 60 percent, by weight of the layer, of an interpolymer derived from ethylene and vinyl alcohol monomer units.

11 Claims, 2 Drawing Sheets

(51) Int. Cl.
*B32B 27/08* (2006.01)
*B32B 27/34* (2006.01)

(56) References Cited

U.S. PATENT DOCUMENTS

| | | |
|---|---|---|
| 6,335,410 B1 | 1/2002 | Finlayson et al. |
| 6,723,810 B2 | 4/2004 | Finlayson et al. |
| 2002/0160129 A1* | 10/2002 | Piper ................. B32B 27/32 428/34.1 |
| 2005/0058845 A1 | 3/2005 | Bellet et al. |
| 2006/0199914 A1* | 9/2006 | Harris et al. ................. 525/242 |
| 2008/0176968 A1* | 7/2008 | VanSumeren ............. C08J 3/02 521/97 |
| 2010/0029827 A1* | 2/2010 | Ansems ................. B32B 27/08 524/451 |
| 2010/0160497 A1* | 6/2010 | Karjala ..................... C08F 8/00 524/13 |
| 2011/0045222 A1* | 2/2011 | Peters .......................... 428/35.8 |
| 2011/0229701 A1* | 9/2011 | Rivett ................ B29C 47/0026 428/212 |

OTHER PUBLICATIONS

Williams T, and Ward, I.M. Journal of Polymer Science Part B: Polymer Letters. 6(9) p. 621-24, 1968.
U.S. Appl. No. 61/722,274.
International Search Report and Written Opinion for PCT/US2014/011964, Mail Date Jul. 4, 2014, pp. 1-8.

* cited by examiner

MODIFIED FLEXIBLE EVOH FOR HIGH PERFORMANCE FILMS

FIELD OF INVENTION

The present invention relates to films having good barrier properties in combination with good flexibility.

BACKGROUND AND SUMMARY OF INVENTION

There are many applications where there is a need for a high gas barrier in a flexible film such as in food packaging, silage wrap, stretch hooder applications, and as a radon barrier for residential construction. Films made with ethylene vinyl alcohol (EVOH) polymers are known to be excellent barriers with respect to oxygen and other gases, but EVOH is a brittle polymer with a tendency to crack under simple bending or with an elongation of more than 20%. Once the EVOH layer is cracked the film's barrier properties are significantly degraded. What is needed is a way to modify the EVOH to enable it to withstand nominal abuse conditions without significant decrease in oxygen barrier properties.

In the present invention it was found that by the addition of an ultra-low molecular weight, ultra low density, anhydride and/or carboxylic acid functionalized ethylene/alpha-olefin interpolymer into the EVOH matrix that the EVOH layer will demonstrate significantly improved elongation properties and abuse resistance without significantly altering the pure material's barrier properties.

Accordingly, the present invention relates to a film comprising at least one barrier layer, said barrier layer comprising at least 5 percent, by weight of the layer, of an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min. The barrier film further comprises at least 60 percent, by weight of the layer, of an EVOH polymer.

DETAILED DESCRIPTION OF THE INVENTION

Figure 1:
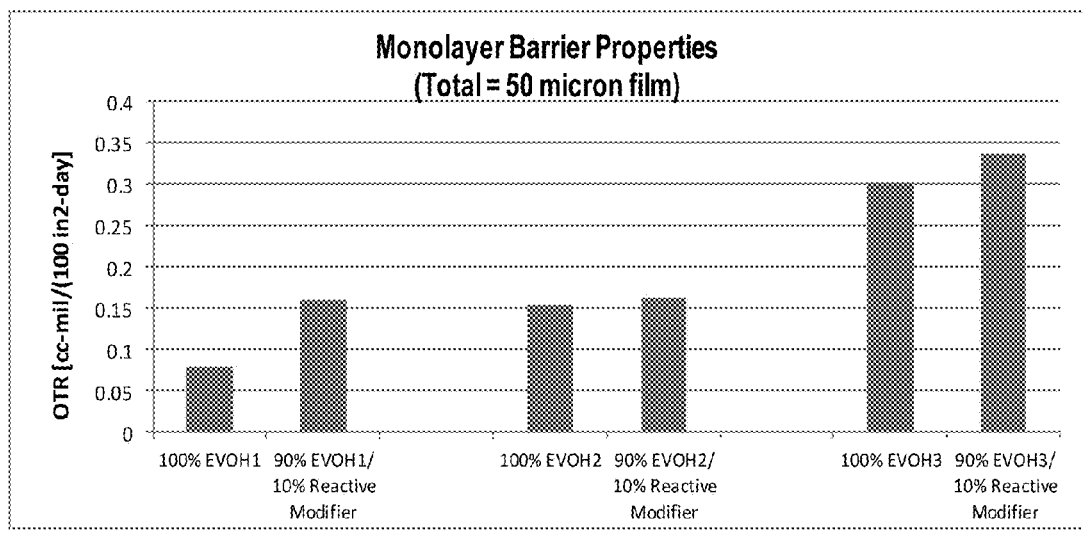
FIG. 1 is a graph of oxygen transmission rates for three pairs of films.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), copolymer and interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/alpha-olefin interpolymer," as used herein, refers to an interpolymer that comprises, in polymerized form, a majority amount of ethylene monomer (based on the weight of the interpolymer), and one or more additional alpha-olefin monomers. The term "ethylene/alpha-olefin interpolymer" includes ethylene/alpha-olefin copolymers, as well as terpolymers and other polymers derived from multiple monomers.

The term, "ethylene/alpha-olefin copolymer," as used herein, refers to a copolymer that comprises, in polymerized form, a majority amount of ethylene monomer (based on the weight of the copolymer), and an alpha-olefin, as the only two monomer types.

The term, "EVOH" as used herein, refers to a polymer comprising repeating units of ethylene and vinyl alcohol. As is generally known in the art the weight ratio of the ethylene to vinyl alcohol defines the bather properties. Such polymers and their methods of manufacture are generally known in the art.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Melt Viscosity

Melt viscosity is measured in accordance with ASTM D 3236 (350° F.), using a Brookfield Digital Viscometer (Model DY-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermosel, and locked into place. The sample chamber has a notch on the bottom that fits the bottom of the Brookfield Thermosel, to ensure that the chamber is not allowed to turn when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index ($I_2$, or MI) of an ethylene-based polymer is measured in accordance with ASTM D-1238, condition 190° C./2.16 kg. For high $I_2$ polymers ($I_2$ greater than, or equal to, 200 g/mole, melt index is preferably calculated from Brookfield viscosity as described in U.S. Pat. Nos. 6,335,410; 6,054,544; 6,723,810. $I_2$ (190° C./2.16 kg)=3.6126[10(log (η)−6.6928)/−1.1363]−9.31851, where η=melt viscosity, in cP, at 350° F.

Oxygen Transmission Rate is determined at 23° C. and 80% relative humidity according to ASTM D-3985.

Gel Permeation Chromatography

The average molecular weights and molecular weight distributions for ethylene-base polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns. The solvent is 1,2,4 trichlorobenzene. The samples are prepared at a concentration of "0.1 gram of polymer" in "50 milliliters" of solvent. The solvent used to prepare the samples contains 200 ppm of butylated hydroxytoluene (BHT). Samples are prepared by agitating lightly for two hours at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M\text{polyethylene}=A\times(M\text{polystyrene})B,$$

where M is the molecular weight, A has a value of 0.4315 and B is equal to 1.0.

Polyethylene equivalent molecular weight calculations were performed using VISCOTEK TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

DSC

Differential Scanning calorimetry (DSC) is used to measure crystallinity in polyethylene (PE) based samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE. The sample is kept at this temperature for three minutes. Then the sample is cooled at a rate of 10° C./min to −60° C. for PE and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE, and multiplying this quantity by 100 (e.g., for PE, % cryst.=(Hf/292 J/g)×100.

Unless otherwise stated, melting point(s) (Tm) of each polymer is determined from the second heat curve obtained from DSC, as described above. The crystallization temperature (Tc) is measured from the first cooling curve.

Density

Density is measured in accordance with ASTM D-792. The density measured was a "quick density," meaning that the density was determined after one hour from the time of molding.

Maleic Anhydride Content—Fourier Transform Infrared Spectroscopy (FTIR) Analysis The concentration of maleic anhydride is determined by the ratio of peak heights of the maleic anhydride at wave number 1791 cm-1 to the polymer reference peak, which, in case of polyethylene, is at wave number 2019 cm-1. Maleic anhydride content is calculated by multiplying this ratio with the appropriate calibration constant. The equation used for maleic grafted polyolefins (with reference peak for polyethylene) has the following form, as shown in Equation 1.

$$MAH(\text{wt. \%})=A*\{[FTIR\ \text{PeakArea}@1791\ cm-1]/[FTIR\ \text{PeakArea}\ 2019\ cm-1]+B*[FTIR\ \text{PeakArea}@1712\ cm-1]/[FTIR\ \text{PeakArea}@2019\ cm-1]\} \quad \text{(Eqn. 1)}$$

The calibration constant A can be determined using C13 NMR standards. The actual calibration constant may differ slightly depending on the instrument and polymer. The second component at wave number 1712 cm-1 accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 cm-1. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. Mylar and Teflon are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate the sample tends to oxidize resulting in an infrared peak at approximately 1740 cm-1, which will cause the values for the graft level to be too low. Maleic anhydride and acid are represented by peaks at about 1791 and 1712 cm-1, respectively.

Secant Tensile Modulus

Blown film samples were tested in accordance to ASTM D882. The reported values are an average of 5 independent sample specimens.

Barrier Film

The present invention relates to a film comprising at least one barrier layer, said barrier layer comprising at least 5 percent, by weight of the layer, of component a) which is a reactive modifier comprising an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min. The barrier film further comprises at least 60 percent, by weight of EVOH polymer.

Component a)

In one embodiment, the reactive modifier is an anhydride and/or carboxylic acid functionalized ethylene/alpha-olefin interpolymer is an anhydride and/or carboxylic acid functionalized ethylene/alpha-olefin interpolymer including ethylene-alpha-olefin copolymers. Preferred alpha-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, and more preferably include propylene, 1-butene, 1-hexene and 1-octene.

The anhydride and/or carboxylic acid functionalization can be any material having the anhydride or carboxylic acid functionality as is generally known in the art. Maleic anhydride is a particularly favored material for functionalization.

In one embodiment, component a) is an anhydride and/or carboxylic acid functionalized ethylene/1-octene interpolymer, and in particular a maleic anhydride grafted ethylene/1-octene interpolymer.

In one embodiment, the anhydride and/or carboxylic acid functionalized ethylene/alpha-olefin interpolymer of Component a) comprises greater than, or equal to, 0.5 weight percent, further greater than, or equal to, 0.8 weight percent, and further greater than, or equal to, 1.0 weight percent of the anhydride and/or carboxylic acid functionality, based on the weight of the polymer.

In one embodiment, the anhydride and/or carboxylic acid functionalized ethylene/alpha-olefin interpolymer of Component a) has a melt viscosity less than, or equal to, 40,000 cP, further less than, or equal to, 30,000 cP, further less than, or equal to, 20,000 cP, and further less than, or equal to, 15,000 cP, at 350° F. (177° C.). In one embodiment, anhydride and/or carboxylic acid functionalized ethylene/alpha-olefin interpolymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.).

In one embodiment, the anhydride and/or carboxylic acid functionalized ethylene/alpha-olefin interpolymer has a molecular weight distribution (Mw/Mn) less than, or equal to, 5.0, further less than, or equal to, 4.0, further less than, or equal to, 3.0, and further less than, or equal to, 2.5. In one embodiment, the anhydride and/or carboxylic acid functionalized ethylene/alpha-olefin interpolymer has a molecular weight distribution (Mw/Mn) greater than, or equal to, 1.1, further greater than, or equal to, 1.3, and further greater than, or equal to, 1.5.

Without intending to be bound by such theory, it is hypothesized that functionalizing ethylene/alpha olefin interpolymers having relatively low molecular weight will result in polymers having low levels of grafting, such as one anhydride and/or carboxylic acid unit per polymeric molecule, on average. It is further theorized that such polymers will result in a much better dispersed particle within the EVOH matrix. This dispersion of fine particles may provide the improved flexibility without interrupting the EVOH matrix which would result in an inferior barrier performance.

Accordingly, in one embodiment, the anhydride and/or carboxylic acid functionalized ethylene/alpha-olefin interpolymer has a weight average molecular weight (Mw) less than, or equal to, 50,000 g/mole, further less than, or equal to, 40,000 g/mole, further less than, or equal to, 30,000 g/mole. In one embodiment, the anhydride and/or carboxylic acid functionalized ethylene/alpha-olefin interpolymer has a weight average molecular weight (Mw) greater than, or equal to, 2000 g/mole, further greater than, or equal to, 3000 g/mole, further greater than, or equal to, 4000 g/mole.

Similarly, it is preferred that the anhydride and/or carboxylic acid functionalized ethylene/alpha-olefin interpolymer has a melt index ($I_2$), or calculated melt index ($I_2$), greater than or equal to, 200 g/10 min, 300 g/10 min, 400 g/10 min, 500 g/10 min or even 600 g/10 min. In one embodiment, the anhydride and/or carboxylic acid functionalized ethylene/alpha-olefin interpolymer has a melt index ($I_2$), or calculated melt index ($I_2$), less than, or equal to, 1500 g/10 min, further less than, or equal to, 1200 g/10 min, and more further less than, or equal to, 1000 g/10 min.

In one embodiment, the anhydride and/or carboxylic acid functionalized ethylene/alpha-olefin interpolymer has a percent crystallinity of less than, or equal to, 40 percent, further less than, or equal to, 30 percent, and further less than, or equal to, 20 percent, as determined by DSC. In one embodiment, the anhydride and/or carboxylic acid functionalized ethylene/alpha-olefin interpolymer has a percent crystallinity of greater than, or equal to, 2 percent, further greater than, or equal to, 5 percent, and further greater than, or equal to, 10 percent, as determined by DSC.

In one embodiment, the anhydride and/or carboxylic acid functionalized ethylene/alpha-olefin interpolymer has a density greater than, or equal to, 0.850 g/cm$^3$, further greater than, or equal to, 0.855 g/cm$^3$, add further greater than, or equal to, 0.860 g/cm$^3$. In one embodiment, the anhydride and/or carboxylic acid functionalized ethylene/alpha-olefin interpolymer has a density less than, or equal to, 0.900 g/cm$^3$, further less than, or equal to, 0.895 g/cm$^3$, and further less than, or equal to, 0.890 g/cm$^3$. In one embodiment, the anhydride and/or carboxylic acid functionalized ethylene/alpha-olefin interpolymer has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$.

The barrier layer comprises from 5 to 25 weight percent, preferably from 6 to 15, or 7 to 12 percent by weight of component a), the reactive modifier.

It is also contemplated that the anhydride and/or carboxylic acid functionalized ethylene/alpha-olefin interpolymer for use as component a) may comprise a combination of two or more embodiments as described herein.

Suitable materials for use as the reactive modifier in the present invention are the functionalized low molecular weight ethylene/alpha-olefin interpolymers described in PCT/CN12/076,986 and U.S. provisional application 61/722,274, each of which are incorporated by reference in their entirety.

Component b)

The barrier layers for use in the films of the present invention further comprise at least 60 percent by weight of the bather layer of a EVOH. The EVOH may have an ethylene content of about 28%, or at least about any of the following values: 20%, 25%, 30%, and 38% by weight. EVOH may have an ethylene content of at most about any of the following values: 50%, 48%, 40%, 35%, and 33% by weight. EVOH may include saponified or hydrolyzed ethylene/vinyl acetate copolymers, such as those having a degree of hydrolysis of at least about any of the following values: 50% and 85%. Exemplary EVOH is commercially available from Evalca Corporation having ethylene contents of 29, 32, 35, 38 and 44 mole percent. As is generally known in the art, lower ethylene content in the EVOH polymers corresponds to improved barrier properties. To one skilled in the art the selection of the particular level of ethylene in the EVOH polymer is not peculiar to the invention since it is well known that the selection is dictated by the ultimate target barrier properties desired whereby the lower ethylene containing EVOH polymers possess improved barrier properties.

The barrier layer comprises from 60 to 95 weight percent, preferably from 75 to 95, or 85 to 94 percent by weight of component b). It is also contemplated that two or more different EVOH polymers as described herein may be used as component b).

Preferably, the barrier layer has a thickness in the range of from 0.8 to 10 microns, more preferably from 1 to 5 microns, or even 1 to 3 microns.

Optional Components

The barrier layers of the present invention may also advantageously contain materials in addition to components a) and b) as described above. For example, non-functionalized polyolefin resins, including other ethylene/alpha olefin resins may be added to enhance various properties of the resin as is generally know in the art.

The polyolefin layer may contain other additives such as mineral oil or other plasticizers. Other additives generally known in the art include materials such as inorganic fillers, conductive fillers, pigments, nucleators, clarifiers, antioxidants, acid scavengers, oxygen scavengers, flame retardants, ultraviolet absorbers, processing aids such as zinc stearate, extrusion aids, slip additives, permeability modifiers, antistatic agents, antiblock additives and other thermoplastic polymers. The use of oxygen scavengers may be particularly preferred as such materials may enhance the oxygen barrier properties of the films. The utility of oxygen scavengers may be uniquely advantaged when used in combination with the present invention.

Film Structure

The films of the present invention may be monolayer films consisting of only the barrier layer as described above, or may be multilayer films comprising the barrier layer together with one or more additional layers. Such additional layers, when present, may be selected to provide additional functionality as is generally known in the art. When the film comprises 3 or more layers it is generally preferred that the barrier layer comprise an internal layer of the film.

It should be understood that when the films of the present invention are multilayer films, then there may be two or more barrier layers, each of which may comprise a) at least 5 percent, by weight of the layer, of an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min; and b) at least 60 percent, by weight of the layer, of EVOH. In such cases it may be preferred that each barrier layer have a thickness of 10 microns or less, more preferably 5 microns or less, or even 3 microns or less.

The additional layers may advantageously comprise a polymeric material selected from the group consisting of propylene based plastomers or elastomers, propylene homopolymers, MDPE, HDPE, LLDPE, LDPE or blends thereof.

The additional layers may also advantageously comprise a polymeric material selected from the group of polymers with the general name of polyamide (Nylon-Tradename of DuPont).

The multilayer films of the present invention preferably have a total thickness, in the range of from 10 μm to 400 μm, more preferably from 15 μm to 250 μm, more preferably from 25 μm to 200 μm, still more preferably from 50 to 100 μm.

The films can be formed using any process generally know in the art including blown films and cast films, in which the individual layers can be coextruded.

Of particular interest for some applications, the films may be oriented in the machine direction or the cross direction, or both the machine and cross direction following the film forming step.

The films of the present invention are well suited for any application requiring good barrier performance including but not limited to silage wrap, liquid packaging, radon bather for housing, and fragrance barriers for food packaging.

While not intending to be bound by theory, the utility of the smaller particle size of the present invention may be particularly evidenced as the layer thickness is decreased. Larger particle domains which result from using conventional polymers are more likely to span the entire width of barrier layers as the thickness of such layer is decreased which is theorized to provide a conduit through the barrier layer thus significantly degrading the barrier properties.

While not intending to be bound by theory, it is believed that the modulus of the reactive modifier (that is, component (a)) should be less than the modulus of the EVOH polymer being modified to achieve improved durability. The present invention utilizes an ultra low density modifier having a very low modulus, but one skilled in the art would realize that a polymer with a similar molecular weight but having a higher modulus could likewise serve as an effective reactive modifier for EVOH polymers having a relatively higher modulus.

The polymers, compositions and processes of this invention, and their use, are more fully described by the following examples. The following examples are provided for the purpose of illustrating the invention, and are not to be construed as limiting the scope of the invention.

EXAMPLES

In order to demonstrate the effectiveness of the present invention a series of barrier films were made. The target structures are prepared by first compounding the reactive modifier into the EVOH using a range of EVOH grades, modifier grades, and processing conditions. Three different types of EVOH polymers are examined. EVOH 1 contains 32 mol % ethylene, EVOH 2 contains 38 mol % ethylene and EVOH 3 contains 44 mol % ethylene. In this study (see table below) all EVOH polymers are supplied by Kuraray America, Inc. and sold under the trade name of EVAL*polymers. In most cases the polymer tested was EVAL H 171B, an EVOH containing 38 mol % of units derived from ethylene.

The reactive modifier (when present) used in each of the Examples is prepared as follows:

Synthesis of Component A—MAH-g-EO1:

The following materials are used to make the reactive modifier used in the Examples:

Base resin: Low molecular weight ethylene-octene copolymer, nominally 1250 MI, 0.87 g/cc density ethylene-octene copolymer.

Maleic Anhydride (MAH):—DeGussa DHBP or equivalent

Hydrobrite 380:—hydrotreated paraffinic oil to dilute peroxide as needed. (1:1 ratio of peroxide:oil).

Peroxide: LUPEROX 101—2,5-Bis(tert-butylperoxy)-2,5-dimethylhexane (290.44 g/mol).

The reactive modifier is made using a "92 mm" co-rotating twin screw extruder (TSE). The process is summarized in the following steps: (a) base resin polymer pellets are fed into the extruder hopper of the extruder by a gravimetrically, controlled auger feeder, at the desired polymer feed rate; (b) molten MAH is injected into the barrel; (c) peroxide is added via a 1:1 mineral oil solution, at a target feed rate, and injected into the barrel, downstream from the MAH; (d) kneading blocks distribute the reactive ingredients and heated the polymer melt through mechanical energy dissipation, and the reaction occurs following thermal decomposition of peroxide initiator; (e) volatile unreacted components and byproducts are removed at a vacuum port; (0 the melt is cooled in the final barrel section and is fed to a gear pump; (g) the gear pump feeds a die, from which the melt goes to an underwater pelletizer. A pellet slurry cooling line of sufficient length is used to achieve residence time greater than 60 seconds, to cool pellets to less than 25° C. The pelletized product is dried and collected.

Once the reactive modifier has been made a series of EVOH resins compounded with the reactive modifier is prepared using a large scale Century—ZSK-40 37.12L/D extruder with 9 barrels using a mixing screw design. The underwater diverter valve assembly is equipped with a 6 hole (3.175 mm hole diameter) under water die. The pelletizer has a 4 blade hub. The run has nitrogen in barrel 4 of the extruder. The first barrel section is set at 25° C. whereas the remaining barrel zones are set between 25° C. and 225° C. The screw speed is set at 220 rpm and the material is fed at 68 kg/hr. This results in melt temperatures between 220-229° C. The material is underwater pelletized used a Gala underwater pelletizer.

In all cases after compounding the polymers are stored in moisture proof bags and further they are dried prior to the blown film fabrication step. The samples are dried using a hot air recirculation oven using the recommended drying temperatures for EVOH.

Monolayer film samples are produced on a LabTech 5-Layer blown film line run by using the same polymer feed in all 5 layers represented as layers A/B/C/D/E with the "A" layer being in the inside of the bubble. The individual feed lines vary by position on the bubble. Layers "A" and "E" (outside layers) are fed from a 25 mm single flight screw which contains no mixing elements. Layers "B", "C", and "D" (three inner layers) are fed from a 20 mm single flight screw which contains no mixing elements. The 5 extruders combined produce a feed to the 75 mm 5-layer flat die (30/11/18/11/30) of 23 kg/hr. The blow up ratio is 2.5. The barrel temperatures range from 166° C. to 232° C. The standard frost line height is 30 cm.

Coextruded 5 layer film samples are produced on an Alpine 7-Layer blown film run by using the same polymer feed in two of the 7 layers represented as layers A/B/C/D/E/F/G with the "A" layer being in the inside of the bubble. The 5 layer structure is achieved by combining the "A" and "B" layers and the "F" and "G" layers. The individual feed lines are all 50 mm 30:1 L/D grooved feed extruders where each extruder was fed from a 4 component blender. The 7 extruders combined produce a feed to the 75 mm 7-layer flat die (30/11/18/11/30) of 23 kg/hr. The blow up ratio is 2.38. The barrel temperatures range from 166° C. to 232° C. The standard frost line height is 30 cm. The film thickness is maintained using an auto profile air ring system and an IBC.

Results

No characterization of the compounded pellets is done. All of the data is for blown film articles. In FIG. 1, the monolayer films of the three EVOH polymers are compared to the same polymers with the addition of the reactive modifier which was added in each case in an amount of 10% by weight. As shown, the measured oxygen barrier properties for EVOH2 and EVOH 3 are essentially unchanged with the addition of the modifier while the barrier properties for EVOH 1 are degraded but still in line with EVOH2.

A 5 layer structure is produced using the Alpine 7 layer line with a target structure of 34 micron thickness. Layer "D" is either 100% EVOH2 as a comparative example, or compounds of the reactive modifier at 10% by weight with the balance either EVOH1, EVOH2, or EVOH3 as indicated in Table 1. All of the compounds were prepared using the single screw compounding line.

A: 20.4% Polyethylene (0.917 density, 0.8 MI)
B: 20.4% Polyethylene (0.917 density, 0.8 MI)
C: 6.6% PE based tie layer (0.920 density, 1 MI)
D: 5.5% EVOH (pure or compounded with reactive modifier
E: 6.6% PE based tie layer (0.920 density, 1 MI)
F: 20.4% Polyethylene (0.917 density, 0.8 MI)
G: 20.4% Polyethylene (0.917 density, 0.8 MI)

This structure was produced and the films were tested using conventional film testing protocols as indicated in Table 1.

TABLE 1

| Properties | ASTM Method | Units | 90% EVOH2 | 90% EVOH3 | 90% EVOH1 | 100% EVOH2 |
|---|---|---|---|---|---|---|
| Dart | ASTM D1709 | g | 340 | 322 | 247 | 292 |
| Secant Modulus CD at 1% | ASTM D882 | psi | 50566 | 50263 | 52662 | 57332 |
| Secant Modulus MD at 1% | ASTM D882 | psi | 46363 | 45791 | 50767 | 51789 |
| Elmendorf Tear CD | ASTM D1922 | g | 1795 | 1564 | 2064 | 1607 |
| Elmendorf Tear MD | ASTM D1922 | g | 1289 | 1147 | 1228 | 665 |

In Table 1 there is a direct comparison between a multilayer film where the core barrier layer, which makes up only 5.5% of the total film thickness, is either modified or pure EVOH2. It is surprising that such a small change in the total film composition can result in nearly doubling the MD tear properties from 665 to 1289 grams and yield a 15% improvement in Dart performance (292 to 340 grams).

Figure 2:
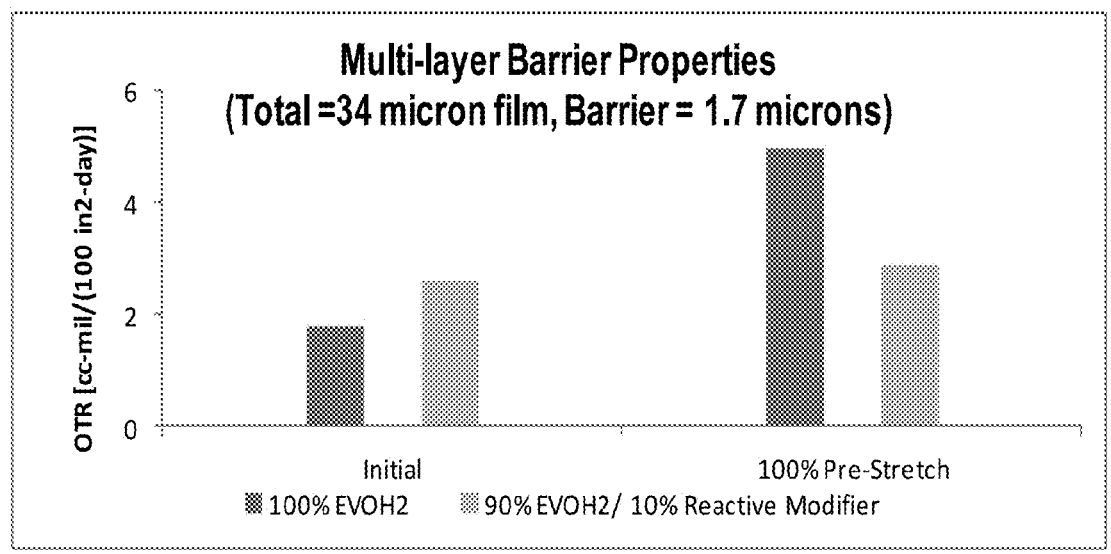
FIG. 2 is a graph of oxygen transmission rates of multilayer films before and after stressing the films.

Surprisingly, for the coextruded multilayer films where the barrier layer is either pure EVOH2 or EVOH2 compounded with 10% of the reactive modifier, the oxygen barrier properties are retained after significant abuse. For the data shown in FIG. 2, the coextruded films were tested for oxygen permeability as initially produced and then after being stretched 100% and then allowed to retract to an unstressed state. As seen in FIG. 2, the barrier property for the pure EVOH2 structure is significantly degraded with a loss of greater than 300% whereas the case where the barrier layer is modified with the inventive polymer there is essentially no change in barrier properties.

What is claimed is:

1. A film comprising at least one barrier layer, said barrier layer comprising
   a. at least 5 percent, by weight of the layer, of an anhydride and/or carboxylic acid functionalized ethylene/alpha-olefin interpolymer having a density in the range of from 0.855 to 0.900 g/cm$^3$; and having a melt index (190° C./2.16 kg) of greater than 200 g/10 min; and
   b. at least 60 percent, by weight of the layer, of EVOH, wherein the level of grafting on average is one anhydride and/or carboxylic acid unit per functionalized ethylene/alpha-olefin interpolymer molecule, further wherein the barrier layer has a thickness in the range of from 1 to 10 microns and the film has a total thickness in the range of from 15 to 400 microns.

2. The film of claim 1 wherein the barrier layer further comprises one or more non-functionalized polyolefin resins.

3. The film of claim 1 wherein the barrier layer further comprises one or more oxygen scavengers.

4. The film of claim 1 wherein the functionalized ethylene/alpha-olefin interpolymer has been functionalized with maleic anhydride.

5. The film of claim 1 wherein the ultra low density ethylene interpolymer has a melt index greater than 500.

6. The film of claim 1 wherein the film is a multilayer film.

7. The film of claim 6 wherein the barrier layers comprises two or more layers of the film.

8. The film of claim 7 wherein each barrier layer has a thickness of 5 microns or less.

9. The film of claim 8 wherein the film has a total thickness in the range of from 25 microns to 200 microns.

10. The film of claim 1 wherein component b) comprises 75-95 percent of the barrier layer.

11. The film of claim 1 wherein component a) comprises 7 to 12 percent of the barrier layer.

* * * * *